United States Patent [19]
Sebulke

[11] 3,822,768
[45] July 9, 1974

[54] CONE FRICTION BRAKE

[75] Inventor: Johannes Sebulke, Gevelsberg, Germany

[73] Assignee: DEMAG Aktiengesellschaft, Duisburg, Germany

[22] Filed: Sept. 25, 1972

[21] Appl. No.: 292,082

[30] Foreign Application Priority Data
Oct. 20, 1971 Germany.............................. 2152256

[52] U.S. Cl............ 188/70 R, 188/79.5 R, 192/8 R
[51] Int. Cl............................................. F16d 53/00
[58] Field of Search..... 188/70 R, 134, 166, 79.5 R; 192/8 R

[56] References Cited
UNITED STATES PATENTS
3,198,293    8/1965    Mathews....................... 188/70 R X
3,285,377    11/1966   Rasmussen..................... 188/134 X FOREIGN PATENTS OR APPLICATIONS
118,343    3/1901    Germany........................... 188/134
918,063    9/1954    Germany........................... 188/134

Primary Examiner—Duane A. Reger
Attorney, Agent, or Firm—Mandeville and Schweitzer

[57] ABSTRACT

Disclosed herein is an improved cone friction brake with an interior brake drum and an exterior brake ring having a brake lining disposed therebetween. The brake drum is connected to an axially displaceable shaft on the apparatus, e.g., an electric motor, to be braked, while the brake ring, which is non-rotatable, is mounted for limited displacement in the apparatus housing by a unique self-adjusting mechanism.

9 Claims, 6 Drawing Figures

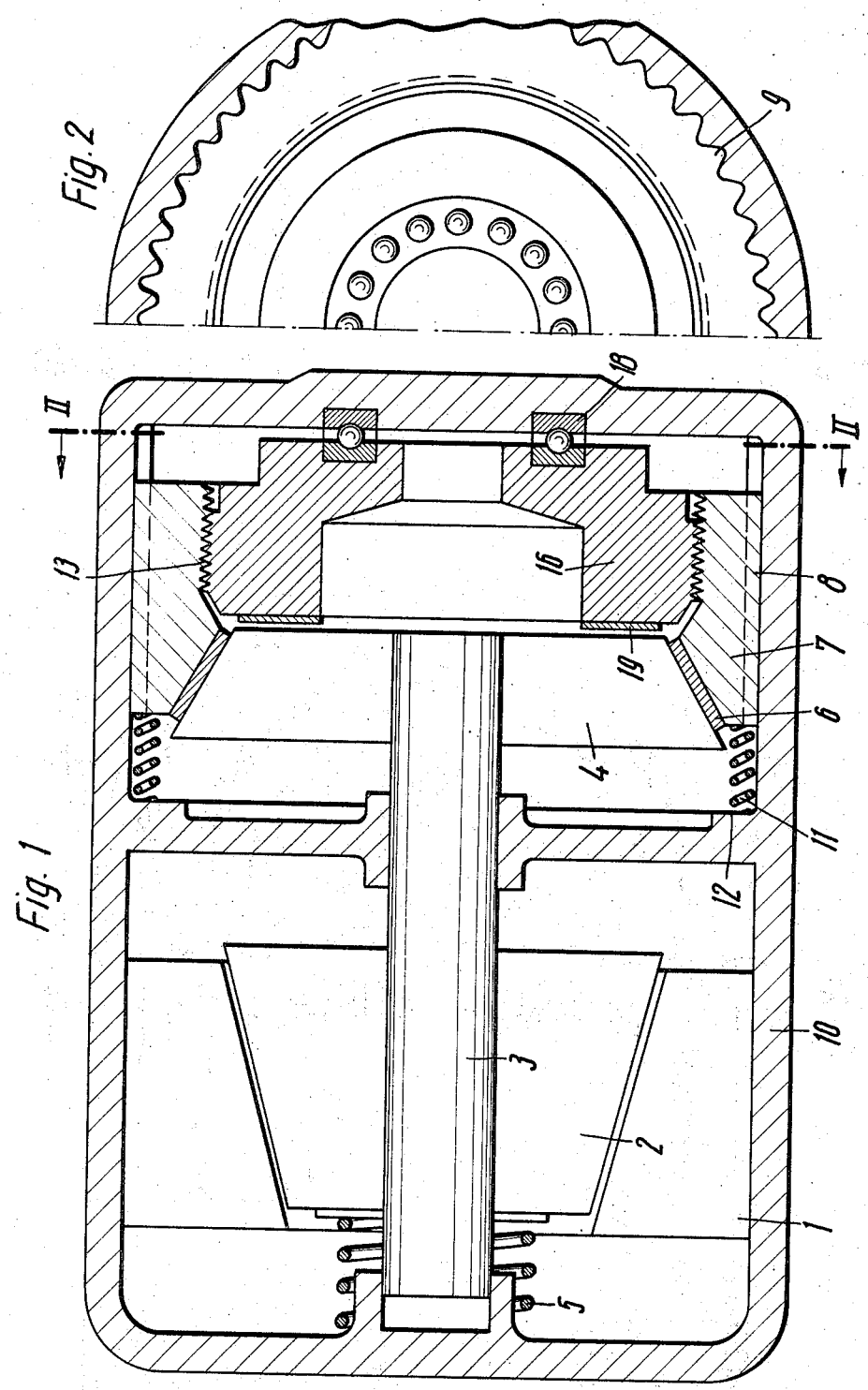

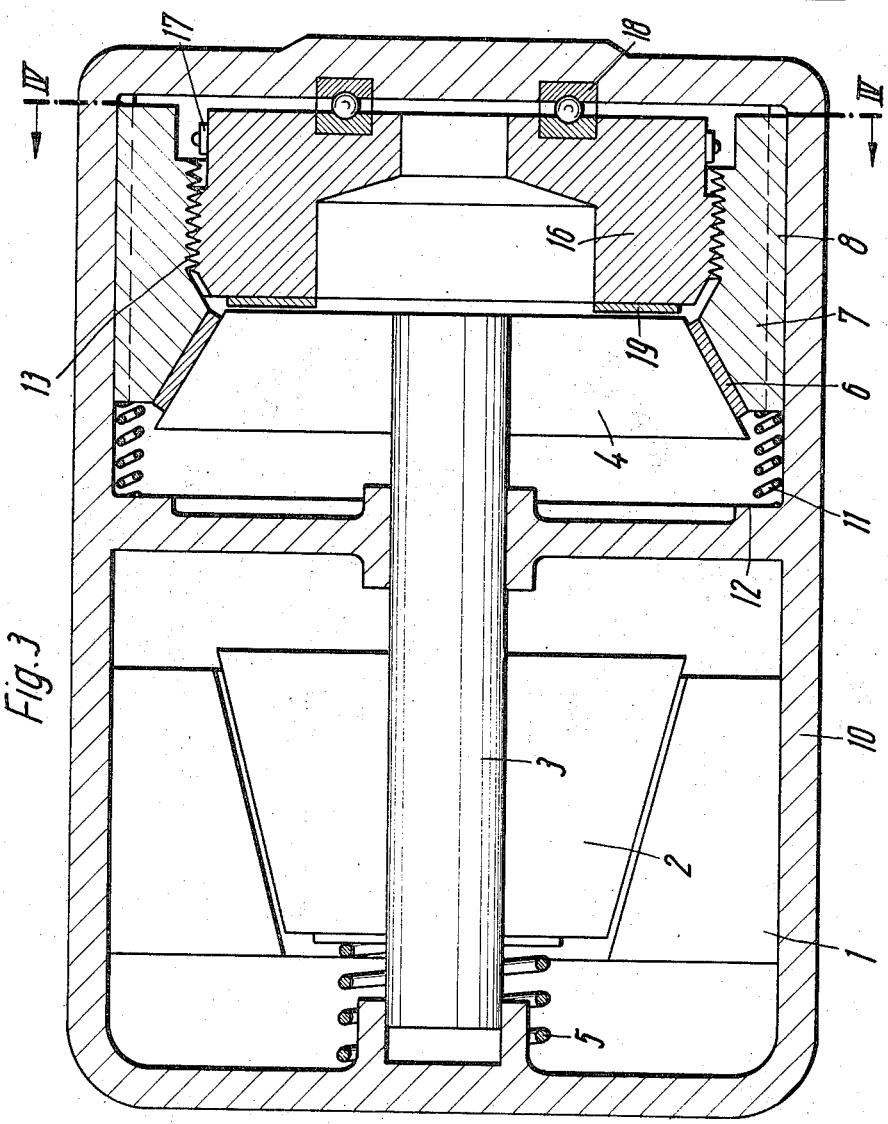

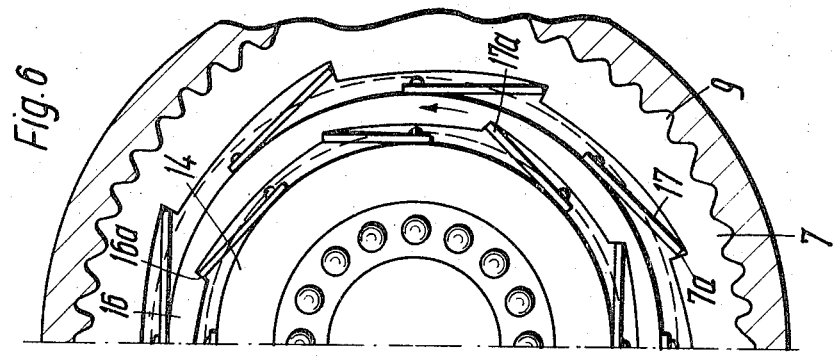
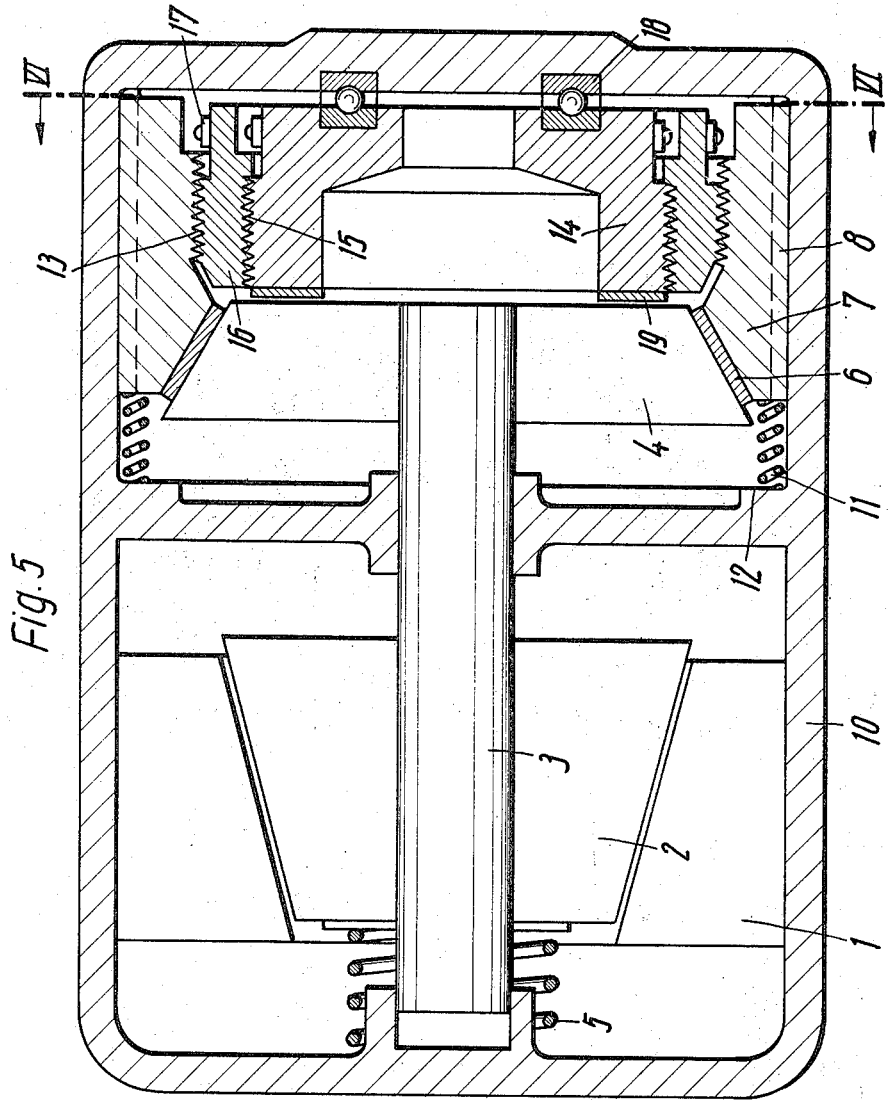

CONE FRICTION BRAKE

BACKGROUND OF THE INVENTION

Cone friction brakes are generally used for displacement rotor motors. German Pat. No. 1,138,149 shows a cone friction brake with an axially displaceable brake ring disposed within a motor casing for shock absorption. The axial displacement distance of a displacement rotor motor is limited. Thus, the cone friction brake must be manually adjusted from time to time for wear and periodic inspections for this purpose are required.

SUMMARY OF THE INVENTION

The object of this invention is to design a self-adjusting cone friction brake for use in electric motors or the like, which requires minimum maintenance. This may be done by connecting the non-rotatable element which is axially displaceable, e.g., the brake ring, through at least one thread means and moving this element in relation to the rotatable element, e.g., the brake drum, with a rotatable adjustment ring. Dogs placed between this adjustment ring and the rotatable element (brake drum) become engaged and effective as the brake lining wears away to self-adjust the brake drum-brake ring relationship.

When the motor is deenergized, the brake drum moves progressively further into the brake ring, with progressive wear of the brake lining, until the brake drum contacts the dogs of the rotatable adjustment ring to advance the same. Thus, the brake ring is gradually displaced, by the threads, towards the brake drum to compensate for the wear of the brake lining. Therefore, the shaft displacement distance, when the dogs become effective, remains a constant.

In accordance with other aspects of the invention, the brake ring has projections catching in grooves of the housing to prohibit rotation. Furthermore, the non-rotatable brake ring is biased by springs which produce a force in the disengagement direction of the cone friction brake, an arrangement which eliminates accidental contacting of the brake lining and dogs with the brake drum.

As another important aspect of the invention, a regression control is arranged between the non-rotatable brake ring and the rotatable adjustment ring, which regression or anti-reverse control eliminates a reversal of the adjustment ring if the brake should slip under load. The regression control is formed by flat "pawl" springs. One end of each flat spring is attached to the periphery of the adjustment ring, and the other or free end of each flat spring is directed tangentially away from the periphery of the adjustment ring, and in the "locked" position of the adjustment ring, they rest on the ratchet-shaped support surfaces of the brake ring. In this fashion, simple ratchet and pawl means create a reliable regression control. With an increasing number of ratchet-like elements, the possibility of regression of the brake ring is greatly reduced. As will be understood, when using eight flat pawl springs and eight ratchet support surfaces, the brake ring may regress by a maximum of 45°. This small regression causes no unduly prohibitive increase in the displacement distance for most displacement motors.

There may be, however, instances where the brake must be adjusted for reverse motor action. For such a case, the invention provides an interior ring, disposed within the adjustment ring, mounting the dogs and a regression adjustment thread which counteracts the adjustment thread. An engaging device is placed between the adjustment ring and the interior ring for the adjustment ring which facilitates the return of the interior ring in the adjustment direction in the event that the cone friction brake slips. The engaging device is similar to the "anti-reverse" mechanism described hereinabove and is also formed by flat "pawl" springs. One end of each pawl spring is attached to the periphery of the interior ring, while the other end is directed tangentially away from the periphery opposite to the turning direction of the interior ring. In the engaged position, these pawl springs rest on the ratchet-shaped support surfaces of the adjustment ring.

As will be appreciated and in accordance with the invention, if a displacement motor rotor regresses after power shut-off, or if the rotor is stopped from opposite rotary direction, the regression control arranged between the brake ring and the adjustment ring will eliminate noticeable regression of the brake ring. The brake ring, when regressing, turns the interior ring through the dogs, and the regression adjustment thread of the interior ring effects, through the adjustment ring, the axial displacement of the brake ring toward the brake drum. In lieu of the ratchet and pawl mechanisms, freewheeling mechanisms or equivalent elements may be used as regression controls and/or engaging devices.

To decrease the friction during brake adjustment, the adjustment ring may be supported in the casing by an axial pressure bearing. Advantageously, the dog for the adjustment ring is a brake lining element fastened to the adjustment ring or the interior ring or to the brake ring.

For a more complete understanding of the present invention and a better appreciation of its attendant advantages, reference should be made to the following detailed description of the preferred embodiments taken in conjunction with the accompanying drawings.

DESCRIPTION OF DRAWINGS

FIG. 1 is a longitudingal cross-sectional view of a displacement rotor motor with cone friction brake embodying the inventive principles;

FIG. 2 is a cross-sectional view taken along line 2—2 of FIG. 1;

FIG. 3 is a longitudinal cross-sectional view of the displacement rotor motor with cone friction brake and regression control embodying the inventive principles;

FIG. 4 is a cross-sectional view taken along line 4—4 of FIG. 3;

FIG. 5 is a longitudinal cross-sectional view of a displacement rotor motor with cone friction brake, regression control and engaging device embodying the inventive principles; and FIG. 6 is a cross-sectional view taken along line 6—6 of FIG. 5.

DETAILED DESCRIPTION OF THE INVENTION

All illustrated embodiments of the invention are such that they include a support 1 of a displaceable rotor 2 (of an electric motor, for example) housed in a casing 10. Like reference numerals will be used to indicate like elements throughout the description. A truncated cone brake drum 4 is attached to the rotor shaft 3. When the motor is deenergized, the shaft 3 is axially forwardly displaced by a brake spring 5, and the brake drum 4 is pressed against the brake ring 7, as shown in FIG. 1. A brake lining 6 is attached either to the brake drum 4 or to the brake ring 7. The brake ring 7 is prevented from rotation by radial projections 8 disposed in grooves 9 in the casing 10. The ring 7 may be displaced axially and is constantly biased in the disengagement direction of the cone friction brake drum by springs 11, which are mounted in the spring support 12 in the housing 10.

In the embodiment of FIGS. 1 and 2, the inner surface of the brake ring 7 has an adjustment thread 13 engaged with mating thread on the adjustment ring 16, which ring 16 is biased by springs 11 against an axial pressure bearing 18 located at the front of housing or casing 10. A dog 19, advantageously formed by an annular brake lining element, is arranged between the brake drum 4 and the adjustment ring 16.

In the embodiment of FIGS. 3 and 4, the adjustment thread 13, arranged between the brake ring 7 and the adjustment ring 16, extends just short of the end facing the front of casing 10. A regression control or anti-reverse mechanism is arranged in the non-threaded portion. It includes flat pawl springs 17, which are screwed or otherwise fastened to the adjustment ring 16. The free ends of flat springs 17 extend into ratchet-shaped recesses of the brake ring 7. When "self-adjusting" the cone friction brake, the brake drum 4 drives the adjustment ring 16 in the arrow direction through the dog 19. The flat springs 17 slide along the surfaces 7b of the brake ring 7 and, when the rotor 2 and the brake drum 4 tend to be rotated in the reverse (non-operational) direction by exterior influences, they are engaged by the ratchet surfaces 7a of the brake ring 7.

When rotated, the adjustment ring 16 will move the brake ring 7, through the adjustment thread 13, toward the brake drum 4 until it engages the brake lining 6 again and thus nullifies the pressure of brake drum 4 on the dog 19.

In the embodiment of FIGS. 5 and 6, a regression adjustment thread 15 for an interior ring 14 is provided on the surface of the adjustment ring 16. In order to leave space for an engaging device, the regression adjustment thread 15 does not extend to the front end of interior ring 14. There are flat pawl springs 17a attached to that unthreaded end of interior ring 14, which flat springs 17a engage support surface 16a of the adjustment ring 16 when the interior ring 14 is rotated in the desired direction of rotation of the motor, as indicated by the arrow. The adjustment ring 16 rotates the brake ring 7, through the adjustment thread 13, advancing it toward the brake drum 4.

If the motor slips relative to its normal rotational direction when it is retarded, the reverse rotation direction is transferred to interior ring 14 through the dog 19, which then rotates against the arrow direction within the adjustment ring 16, which ring 16 cannot rotate because of the flat springs 17 resting on ratchet support surfaces 7a. The rotation of the interior ring 14, therefore, causes an axial displacement of the adjustment ring 16 and the brake ring 7 toward the brake drum 4 until the brake drum 4 reengages the brake lining 6 rather than the dog 19.

The cone friction brake of FIGS. 5 and 6, having an interior ring 14 may be used to advantage in bi-directional electric motors of the type used in machine tools.

It is to be understood that the drawings herein are merely schematic diagrams for the purposes of explanation and do not represent actual scale drawings. The devices illustrated in the drawings are cone friction brake mechanisms at the time of delivery, i.e., "off the shelf." In the schematic drawings, the illustrated brake linings have not yet been used, and, therefore, a very slight air gap has been shown between the brake drum 14 and the brake lining element 10. This gap is actually considerably less than that shown in the drawings. After some wear of the brake lining element 6 during the "running-in period" and in the normal operation of the inventive brake mechanisms, the brake drum will simultaneously engage both of the brake lining elements 6 and 19. Thereafter, any wear occurring to the brake lining 6 during the operation of the device will be automatically compensated for, and the displacement of the rotor 2 will not be increased by additional wearing of the brake lining element 6, all in accordance with the invention. That is to say, with increased wear of brake lining 6, there will tend to be an increase in pressure or torque exerted on the adjustment ring 16 through brake drum 4 (torque will be transmitted from the drum 4 to the brake lining 19); concurrently, there will tend to be a decrease in pressure or torque transmitted from the brake drum 4 to the brake lining element 6. The imbalance of the torque supplied to the separate brake elements 6 and 19 tends to increase until the adjustment ring 16 is actually rotated (by the torque of the brake drum 4 acting through the brake element 19) thereby effecting a "self-adjustment" of the entire unit. This self-adjustment continues until the wear of the brake lining element 6 has been properly compensated and a balance of the torque applied to the elements 6 and 19 has been restored. When further wear causes an imbalance, the above-described process is repeated until balance is once again restored. All the while, the total axial displacement of the rotor (between braking and rotating positions) remains effectively constant.

With careful selection of the structural parameters (namely, contacting surface areas; friction characteristics of the brake lining elements 6 and 19; diameter, thread pitch, shape of thread 13; degree of lubrication; etc.), the majority of the wear of the two brake elements may be restricted to the brake lining element 6 (approximately 85 percent) with the remaining small portion (15 percent) of the total wear being accommodated by the brake lining element 19. Indeed, with the optimum structural design of the new unit, the percentage of wear on the brake lining element 19 may be decreased to the point that it is practically negligible in comparison with the almost total wear of the brake lining element 6.

It should be understood that the embodiments of the invention herein illustrated and described are intended to be representative only, as certain changes may be made therein without departing from the clear teachings of the disclosure. Accordingly, reference should be made to the following appended claims in determining the full scope of the invention.

I claim:

1. A cone friction brake having an interior truncated conical brake drum and an exterior brake ring with a first brake lining disposed therebetween, said brake drum being connected to a rotatable shaft which is axially displaceable in an apparatus to be braked, said brake ring being non-rotatable and axially displaceable within a solid housing, said brake being further characterized in that
   a. said non-rotatable, axially displaceable brake ring is connected through at least one thread means to a rotatable adjustment ring;
   b. said thread means being adapted to displace said rotatable adjustment ring in relation to said non-rotatable brake ring; and
   c. a second brake lining means is disposed between said adjustment ring and said brake drum to transmit torque from said drum to said adjustment ring as said first brake lining is worn away;
   d. whereby rotation of said adjustment ring tends to maintain, as a constant, the axial displacement of said shaft.

2. A cone friction brake in accordance with claim 1, in which
   a. said non-rotatable brake ring has projections engaging in mating grooves formed in said housing.

3. A cone friction brake in accordance with claim 1, in which
   a. said non-rotatable brake ring is biased by springs which produce a force active in the disengagement direction of the cone friction brake.

4. A cone friction brake in accordance with claim 1, in which
   a. a regression control means is arranged between the non-rotatable brake ring and the rotatable adjustment ring.

5. A cone friction brake in accordance with claim 4, in which
   a. said regression control means includes flat pawl springs;
   b. one end of each pawl spring is attached to the periphery of the adjustment ring;
   c. ratchet-shaped support surfaces are formed in said brake ring;
   d. the free end of each pawl spring is directed tangentially away from the periphery opposite to the direction of rotation of the adjustment ring in a manner whereby in locked position they rest on said ratchet-shaped surfaces.

6. A cone friction brake in accordance with claim 1, in which
   a. an interior ring is provided within the adjustment ring, a second brake means is carried by said interior ring along with a regression adjustment thread for counteracting the adjustment thread.

7. A cone friction brake in accordance with claim 6, in which
   a. an engaging device is disposed between the adjustment ring and the interior ring to effect the return of the interior ring in a predetermined adjustment direction to compensate for slippage.

8. A cone friction brake in accordance with claim 7, in which
   a. the engaging device includes flat pawl driving springs;
   b. one end of each pawl spring is connected to the periphery of the interior ring and the free end of which spring is directed tangentially away from the periphery opposite to the turning direction of the interior ring;
   c. said adjustment ring includes ratchet-shaped inner surfaces;
   d. whereby in locked position of the interior ring the spring rests on said ratchet-shaped support surfaces.

9. A cone friction brake in accordance with claim 1, in which
   a. said adjustment ring is supported in the housing by an axial pressure bearing.

* * * * *